United States Patent

[11] 3,614,429

| [72] | Inventor | Kenneth Edward Gordon Perry<br>Weymouth, England |
|---|---|---|
| [21] | Appl. No. | 785,635 |
| [22] | Filed | Dec. 20, 1968 |
| [45] | Patented | Oct. 19, 1971 |
| [73] | Assignee | United Kingdom Atomic Energy Authority<br>London, England |
| [32] | Priority | Dec. 21, 1967 |
| [33] | | Great Britain |
| [31] | | 58244/67 |

[54] EQUIPMENT FOR READING THERMOLUMINESCENT DOSIMETERS
7 Claims, 5 Drawing Figs.

[52] U.S. Cl. ................................................. 250/71,
250/79
[51] Int. Cl. ................................................. G01t 1/11
[50] Field of Search ................................. 250/71, 79, 71.5

[56] References Cited
UNITED STATES PATENTS
3,419,720  12/1968  Debye et al. .................. 250/71 X
3,420,999  1/1969  Distenfeld ..................... 250/71 X

*Primary Examiner*—James W. Lawrence
*Assistant Examiner*—Davis L. Willis
*Attorney*—Larson, Taylor and Hinds ABSTRACT: A thermoluminescent reader is described having means for introducing a charge of thermoluminescent material into a predetermined location in a lightproof casing between a photoelectric transducer and an electrical heater. When the charge is in this position the heater is moved by remote control into contact with the charge and it is then energized to heat the charge to luminescence in front of the photosensitive part of the transducer from which a measure of the light output is obtained.

EQUIPMENT FOR READING THERMOLUMINESCENT DOSIMETERS

BACKGROUND OF INVENTION

This invention relates to equipment for thermoluminescent dosimetry and more particularly to a device for heating thermoluminescent material and measuring the light emitted therefrom. Such a device is referred to herein as a thermoluminescent reader. As will be understood certain thermoluminescent materials when heated to luminescence yield a light output which, when integrated, is related to, and can be used as a measure of, the dose of radiation previously received by the material. Prior equipment for this purpose has been adapted to handle powder and has provided a support for the material which support is an electrical resistance so that the material may be heated by passing an electrical current through said support.

SUMMARY OF THE INVENTION

According to the present invention a thermoluminescent reader comprises a light-proof casing, means for supporting at a predetermined location within the casing a charge of thermoluminescent material, a photoelectric transducer mounted with its light-sensitive portion adjacent said location, an electrical heater mounted on the side of said location remote from the light-sensitive portion of the transducer, the heater being movably substantially into contact with the adjacent face of any charge or its support at said location.

DESCRIPTION OF DRAWINGS

One example of heater for thermoluminescent material embodying the present invention will now be described with reference to the accompanying drawings in which.

DESCRIPTION OF PREFERRED EMBODIMENTS

Figure 1:
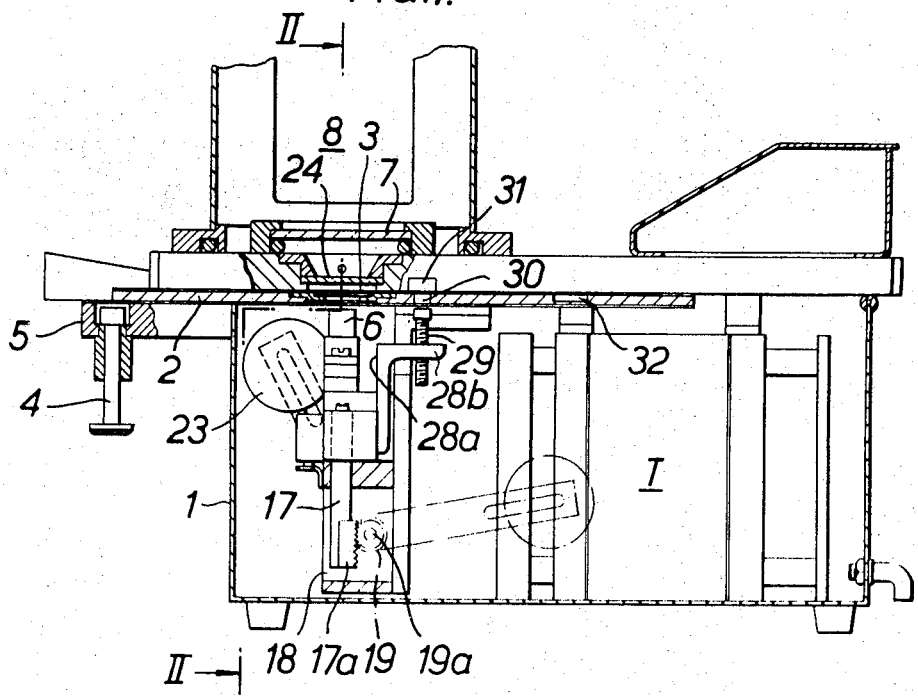
FIG. 1 is a side elevation view in cross section through the device with the tray inserted.
Figure 2:
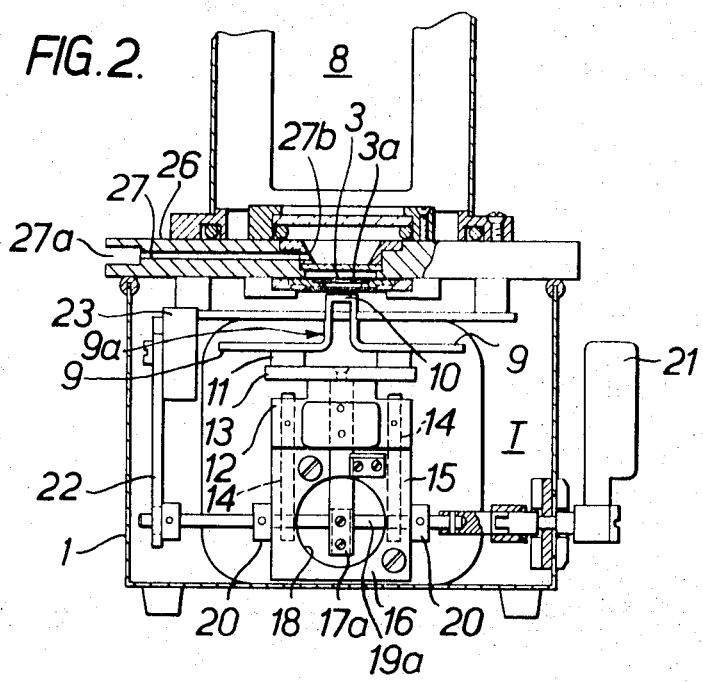
FIG. 2 is a cross-sectional view on the line II—II of FIG. 1.
Figure 3:
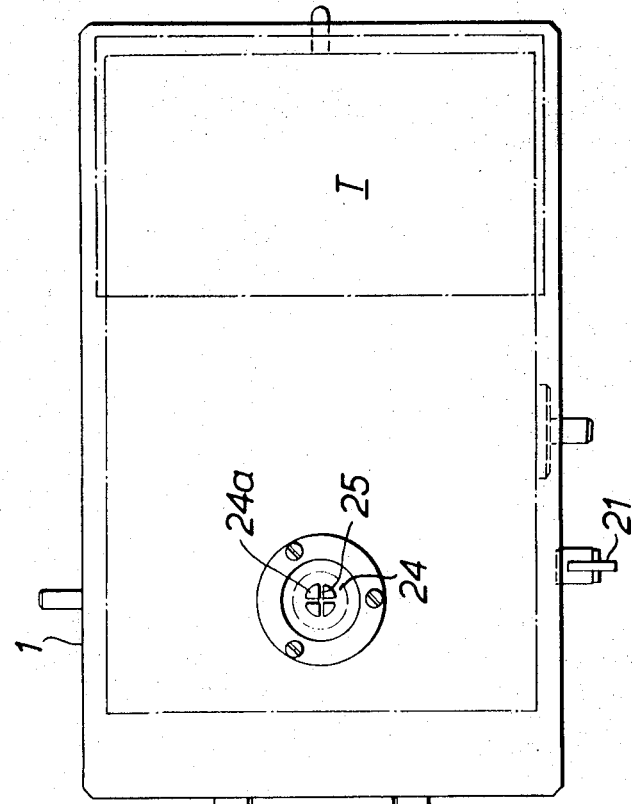
FIG. 3 is a plain view showing the tray in the withdrawn position, and with certain parts omitted.

In the drawings FIGS. 1-3 the heating device is enclosed in a light-proof casing 1 having a slidable tray 2 by means of which a charge of thermoluminescent powder in pellet form may be introduced into a predetermined location in the interior. The tray has a aperture 3 with a stepped groove 3a in its periphery in which a pellet to be heated may be located. In the withdrawn position of the tray, (FIG. 3) the aperture 3 therein coincides with a pin 4 (FIG. 1) captive in a bracket 5 outside the casing so that by raising the pin the pellet may be ejected from the groove. The tray, when inserted into the casing as shown in FIGS. 1 and 2, locates the aperture 3 and hence the pellet accurately in said predetermined location. Inside the casing is provided a photoelectric transducer comprising a photomultiplier tube having its light-sensitive portion adjacent one side of the location and shielded from it by a glass filter 7 which masks the tube from infrared radiation. Hence the tube responds only to visible light emitted from the pellet when heated. On the side of the location remote from the photomultiplier tube 8 is movably mounted an electric heater 10. The heater is shown more clearly in FIG. 2 and comprises two copper bars 9 whose adjacent ends are bent through 90° to support a nickel-chrome disc 9a which acts as a hot plate. The bars are fixed to two pads 11 of asbestos board which are mounted on a pedestal 12 through an intermediate asbestos piece 13. The heating current is supplied to the heater by electrical connections (not shown) between the bars 9 and a transformer T within the casing. The pedestal is drilled with a pair of holes in which are pinned rods 14. The latter protrude downwardly through the holes to enter, slidably, holes 15 drilled in a mounting block 16. Also pinned to the pedestal 12 is a rod 17 which extends, with clearance, through a hole in the mounting block. The latter has a central bore 18 wherein the rod 17 terminates in a rack 17a. The rack is engaged by a pinion 19 fixed to a spindle 19a which extends through holes at diametrically opposite positions of the bore. Where the ends of the spindle 19a emerge from these holes, collars 20 are attached to the spindle to limit sideways motion. One end of the spindle is connected to a coaxial rod carrying an operating handle 21 on the outside of the casing 1. The other end of the spindle carries an arm 22 to which is attached a counterweight 23 whose position, along the arm, is adjustable. The function of the counterweight is to hold the rack 17a in either its raised or lowered position according to the position of the operating hand 21.

Between the glass filter 7 and the said predetermined location is supported a disc 24 with four cutouts 24a leaving crossed grid bars 25. The underside of the bars are formed with V profile. The top plate 26 of the casing is drilled to provide a conduit 27 for inert gas, the outer end 27a of the conduit being coupled by a pipe (not shown) to a source of inert gas supply and the inner end 27b arranged to discharge inert gas in the space between the disc 24 and the filter 7, in order to purge the space of air prior to heating the pellet.

Fixed to the side of the moving pedestal 12 by one flange 28a is an angle member, the other flange 28b of which carried a pin 29, extending proud of the flange. With the tray in the position shown in FIGS. 1 and 2, the pin 29 coincides with a hole 30 in the tray such that in this position the rack could be raised, the head of the pin 29 would then pass into and through the hole 30 into a further hole 31 in the top plate. In any other position of the tray, raising of the rack is prevented by the head of the pin 29 abutting the underside of the tray. In the fully withdrawn position of the tray, a source 32 housed in a recess in the tray comes into register with the photomultiplier tube so that the working of the latter may be checked.

In operation, the tray is firstly withdrawn from the casing into the position in which it is shown in FIG. 3. A dosimeter pellet which incorporates a charge thermoluminescent powder which has been subjected to irradiation is placed on the tray and retained in the groove 3a around the aperture 3. The tray is then pushed into the casing so that the pellet is in the predetermined location above the heater element 6 and below the gridded disc 24 and on the center line of the photomultiplier tube. The pin 29 then comes opposite the hole 30 in the tray. The handle 21 is then turned so as to rotate the spindle which drives the rack upwards so raising the heater element 6. As the heater element rises so the pin 29 enters the hole 30. The top surface of the heater element 6 engages the underside of the pellet and moves on through the aperture 3 in the tray to press the pellet against the gridded disc 24. As the grid engages the pellet, so the rack reaches the upper limit of its travel. The current to the heater is automatically switched on by activation of a microswitch (not shown) and the heater element quickly heats up the pellet. Visible light emitted by the pellet is viewed by the photomultiplier and integrated by the associated instrumentation. After the predetermined time cycle the heater is switched off and lowered by rotating the handle appropriately. The tray may now be withdrawn and the pellet ejected from the tray by means of the captive pin 4 provided for the purpose.

Prior to the heating operation, the space occupied by the pellet is purged with an inert gas which is then switched off.

Of course the equipment described is equally usable with thermoluminescent powder in loose form by providing a small metal dish suitably shaped for sitting in the groove 3a of the aperture. The electrical heating element will engage the underside of the dish and carry it with its contents up into abutment with the gridded disc where the powder grains are heated in similar manner to the pellet.

If it be the intention to make a large number of measurements in fairly quick succession then despite the particular design of the heating element, it is inevitable that the temperature within the casing will rise. It then becomes desirable to cool the photomultiplier tube for the effect of heat is to increase the dark current of the photomultiplier tube, i.e. output due to heat radiation rather than light impinging on the screen. To this end, a preformed coil of copper tube may be slipped over the photomultiplier casing and connected to a supply of cooling water.

Figure 4:
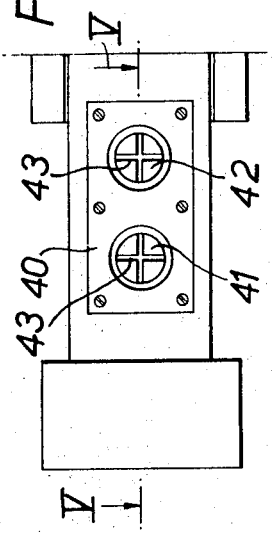
FIGS. 4 & 5 show modifications on part of FIG. 2 in plan and sectional elevation respectively.
Figure 5:
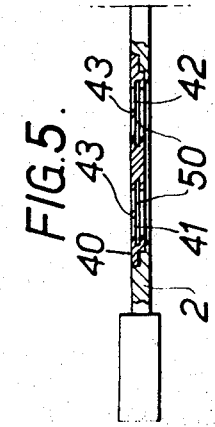

In a modification of the device shown in FIGS. 4 and 5, the tray is adapted to receive a holder 40 which retains a pair of pellets 50 in recesses 41, 42. The pellets are at least in part retained in the holder by crosspieces 43 overlying their, upper, exposed faces and these obviate the need for the gridded disc 24 in the reader. On their reverse sides the faces of the pellets are exposed and the heater is presented to each reverse side in turn, the travel of the sliding tray being extended from that shown in FIGS. 1–3 to allow each pellet in turn to be introduced to the predetermined location within the light-tight casing. Each pellet is heated in situ in the holder by the heater which is moved into contact with the underside of the pellet. The holder with its pellet in place remains stationary during application and operation of the heater. After heating and readout of the pellet the heater is lowered and the tray withdrawn to allow the holder to be removed.

We claim:

1. A thermoluminescent reader comprising a light-proof casing, means for supporting within the casing a charge of thermoluminescent material at a predetermined location, a photoelectric transducer mounted with its light-sensitive portion adjacent said location, an electrical heater mounted on the side of said location remote from the photosensitive portion of the photoelectric transducer, and movable into contact with the adjacent face of any charge supported at said location.

2. A thermoluminescent reader as claimed in claim 1 adapted to receive a charge of thermoluminescent material in the form of a pellet, which, having been irradiated emits light when heated, the reader including means for supporting the pellet at said location, said means presenting one face of the pellet to the photosensitive portion of a photoelectric transducer and its opposite face to the electric heater and means for moving the heater into contact with the face of the pellet adjacent thereto.

3. A thermoluminescent reader as claimed in claim 2 in which a spacer member is disposed between the location and the photosensitive portion of the transducer which member does not significantly restrict the light transmission between the pellet and said photosensitive portion.

4. A thermoluminescent reader as claimed in claim 2 in which the heater is adapted to transpose a pellet supported at said location to a second location more adjacent to the photoelectric transducer.

5. A thermoluminescent reader as claimed in claim 2 which is adapted to receive a charge of thermoluminescent material in the form of a plurality of pellets mounted in a common holder.

6. A TLD reader comprising a light-proof casing, a support for a charge of TLD material, the support being movable to introduce the charge into the casing at a location therein adjacent a light-sensitive device, a heater device movable within the casing from an inoperative position into an operative position whereat the heater makes thermal contact with the face of the charge remote from the light-sensitive device, means for energizing the heater to heat the charge to luminescence, means for measuring the light output as sensed by said light-sensitive device, means for moving the heater away from the charge to permit withdrawal of the charge from the casing and means for deenergizing the heater.

7. A method of reading a charge of thermoluminescent material in pellet form comprising introducing a charge into a light-tight casing, the interior of which contains an electrical heating element, effecting movement of an electrical plate hotplate the casing to bring said plate from a position remote from the charge into face to face thermal contact with the charge, energizing the heater to heat the charge to luminescence, measuring the light output from the charge by means of a photoelectric transducer and moving the heater away from the thermoluminescent material to allow removal of the charge from its support.